(12) United States Patent
Willis

(10) Patent No.: US 12,246,628 B1
(45) Date of Patent: Mar. 11, 2025

(54) CHILD CAR SEAT HEAD RETAINER

(71) Applicant: Bryon Willis, Hinesville, GA (US)

(72) Inventor: Bryon Willis, Hinesville, GA (US)

( * ) Notice: Subject to any disclaimer, the term of this patent is extended or adjusted under 35 U.S.C. 154(b) by 108 days.

(21) Appl. No.: 18/106,387

(22) Filed: Feb. 6, 2023

(51) Int. Cl.
*B60N 2/28* (2006.01)
*A47C 7/38* (2006.01)

(52) U.S. Cl.
CPC ............ *B60N 2/2851* (2013.01); *A47C 7/383* (2013.01)

(58) Field of Classification Search
CPC .............................. A47C 7/383; B60N 2/2839
See application file for complete search history.

(56) References Cited

U.S. PATENT DOCUMENTS

| | | | |
|---|---|---|---|
| 4,707,031 A * | 11/1987 | Meistrell | A47C 7/383 128/869 |
| 4,759,588 A * | 7/1988 | Husnik | B60N 2/286 297/181 |
| 5,007,674 A * | 4/1991 | Franc | B60N 2/286 297/487 |
| D316,792 S | 5/1991 | Schmitz | |
| 5,974,607 A | 11/1999 | Smith | |
| 6,219,865 B1 | 4/2001 | Stokesbary | |
| 6,266,825 B1 | 7/2001 | Floyd | |
| 8,141,187 B2 | 3/2012 | Schwingendorf et al. | |
| 9,622,901 B2 | 4/2017 | Schwingendorf et al. | |
| 9,833,025 B2 | 12/2017 | Knapp | |
| 9,962,021 B2 | 5/2018 | Kreppein | |
| D938,758 S | 12/2021 | Pandit | |
| 2002/0067063 A1 * | 6/2002 | Taborro | A47C 7/383 297/393 |
| 2016/0273877 A1 * | 9/2016 | Martin | F41A 35/04 |

* cited by examiner

*Primary Examiner* — Syed A Islam
(74) *Attorney, Agent, or Firm* — Cramer Patent & Design PLLC; Aaron R. Cramer

(57) ABSTRACT

The present invention is directed to a child car seat head retainer. The child car seat head retainer may comprise a two-part retainer strap. The two-part retainer strap may be adapted to couple to a car seat occupied by a child in order to retain the child's head in an upright position while the child sleeps. The two-part retainer strap may comprise a first strap segment and a second strap segment. The left end of the first strap segment may couple to the left side of the car seat. The right end of the second strap segment may couple to the right side of the car seat. The right end of the first strap segment and the left end of the second strap segment may be adapted to overlap and couple to each other in front of the child's forehead to retain the child's head.

16 Claims, 3 Drawing Sheets

CHILD CAR SEAT HEAD RETAINER

RELATED APPLICATIONS

Non-applicable.

FIELD OF THE INVENTION

The present invention relates to a car seat and more specifically to a head restraining car seat for a child.

BACKGROUND OF THE INVENTION

Infants are delicate creatures that require the utmost care to ensure their safety from potential harm. As a result, there are many products available to provide protection from various dangers. One of the most important safety products for infants is the car seat. While car seat designs and safety features have greatly improved over time, one common issue with most car seats is the tendency for the child's head to move side to side while in motion. This movement, while not necessarily causing injury, can be uncomfortable for the child or even cause them to wake up and cry. This not only causes distress for the child but also for those traveling in the vehicle. There is a need for a solution that eliminates unwanted head movement for children in car seats. The development of the child car seat head retainer addresses this need in a manner that is effective and efficient.

SUMMARY OF THE INVENTION

To achieve the above and other objectives, the present invention provides for a two-part retainer strap for use with a car seat. The strap consists of two segments, a first segment and a second segment. Each segment has a car seat fastener, a coupling fastener, and a storage fastener. The first segment is attached to the front left of the strap, with the left end attaching to the left side of the car seat, and the car seat fastener is located on the front left of the first segment. The second segment is attached to the front right of the strap, with the right end attaching to the right side of the car seat, and the car seat fastener is located on the front right of the second segment. The first car seat fastener is a hook portion of a first hook and loop fastener, and the first coupling fastener is a loop portion of the first hook and loop fastener. The storage fastener is a hook portion of a second hook and loop fastener, which is used to hold the right end of the first segment out of the way when the strap is not in use. The first coupling fastener is located on the rear right of the first segment and is operable to couple to the second coupling fastener on the front left of the second segment, when the retainer strap is in use.

The right end of the first strap segment includes a decoupling handle, which is a loop of material that can be grasped and pulled by a user to assist in separating the first coupling fastener and the second coupling fastener. This handle can be made of material selected from fabric, plastic, or metal. The right end of the first strap segment and the left end of the second strap segment are designed to overlap and couple to each other in front of the child's forehead to retain the child's head. The second coupling fastener is located on the second strap segment and can couple to the car seat when the retainer strap is not in use to hold the left end of the second strap segment out of the way. The second car seat fastener is operable to couple to the right side of the car seat and is disposed on the front side of the second strap segment. The second coupling fastener is also operable to couple to the first coupling fastener, which is located on the rear right of the first strap segment. The first strap segment is coupled to the second strap segment by placing the right end of the first strap segment in front of the left end of the second strap segment and pressing the first coupling fastener and the second coupling fastener together. The first strap segment and the second strap segment are made of material such as nylon, neoprene, polyester, or a combination of those.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
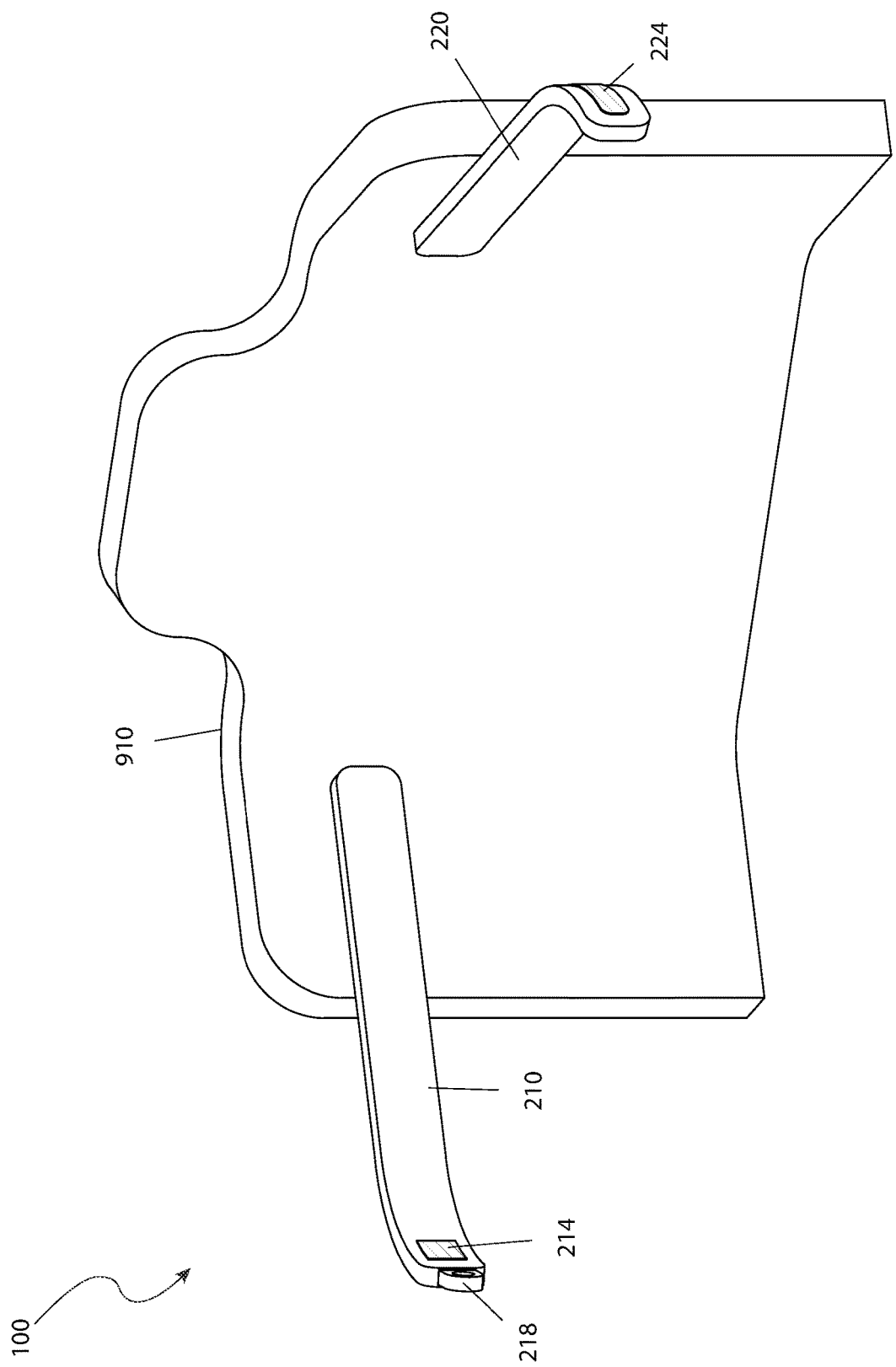
FIG. 1 is an isometric view of a child car seat head retainer, according to an embodiment of the present invention, illustrating the invention coupled to a car seat.
Figure 2:
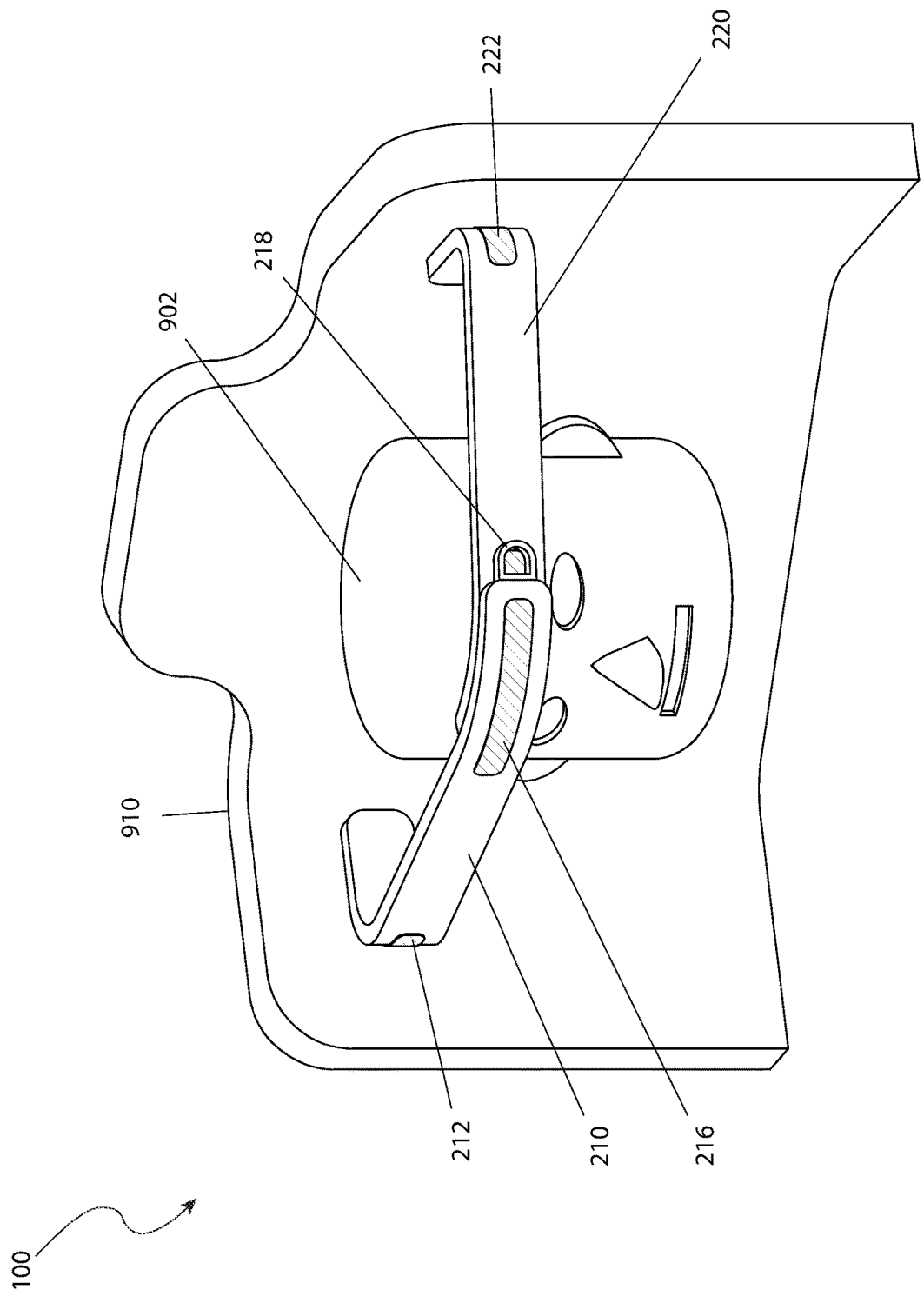
FIG. 2 is an in-use view of a child car seat head retainer, according to an embodiment of the present invention.
Figure 3:
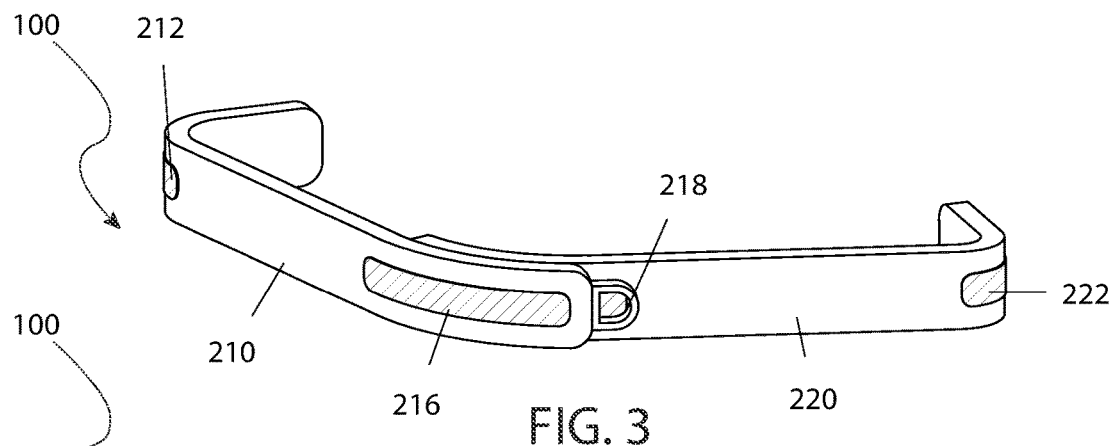
FIG. 3 is an isometric view of a child car seat head retainer, according to an embodiment of the present invention.
Figure 4:
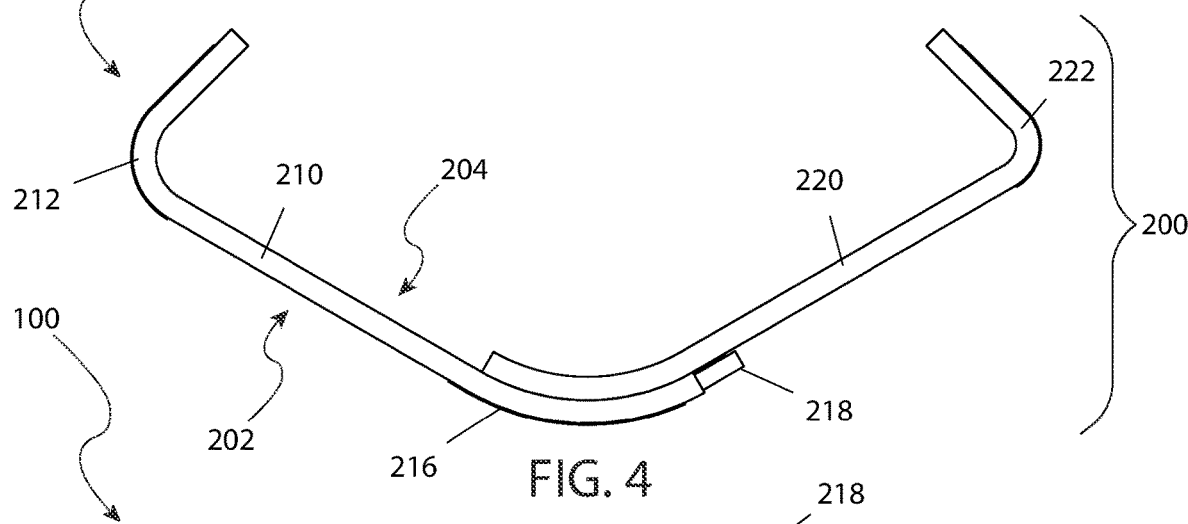
FIG. 4 is a top view of a child car seat head retainer, according to an embodiment of the present invention.
Figure 5:
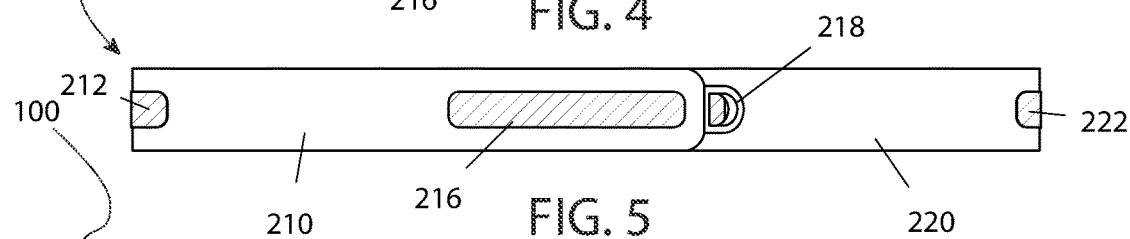
FIG. 5 is a front view of a child car seat head retainer, according to an embodiment of the present invention.
Figure 6:
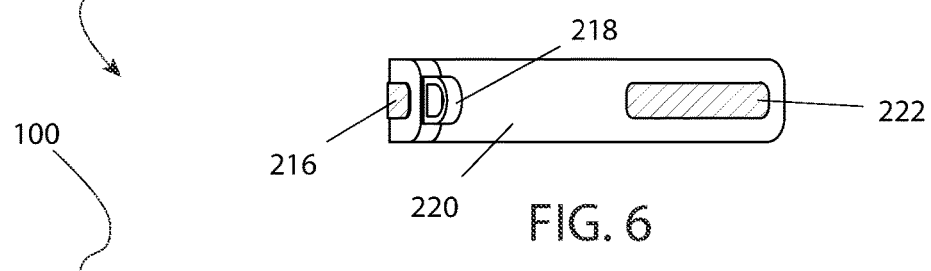
FIG. 6 is a right side view of a child car seat head retainer, according to an embodiment of the present invention.
Figure 7:
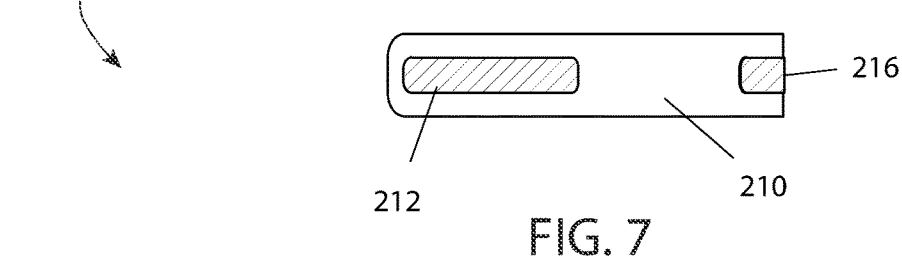
FIG. 7 is a left side view of a child car seat head retainer, according to an embodiment of the present invention.

DESCRIPTIVE KEY 100 child car seat head retainer
200 retainer strap
202 front side
204 rear side
210 first strap segment
212 first car seat fastener
214 first coupling fastener
216 storage fastener
218 decoupling handle
220 second strap segment
222 second car seat fastener
224 second coupling fastener
902 child's head
910 car seat

DESCRIPTION OF THE INVENTION

The present invention is directed to a child car seat head retainer (herein described as the "invention") 100. The invention 100 may comprise a two-part retainer strap 200. The retainer strap 200 may be adapted to couple to a car seat 910 occupied by a child in order to retain the child's head 902 in an upright position while the child sleeps. The retainer strap 200 is not meant to be a safety device to prevent injury during a collision. The retainer strap 200 is meant only to minimize head movement while the child sleeps in the car seat 910. The retainer strap 200 may comprise a first strap segment 210 and a second strap segment 220. The left end of the first strap segment 210 may couple to the left side of the car seat 910. The right end of the second strap segment 220 may couple to the right side of the car seat 910. The right end of the first strap segment 210 and the left end of the second strap segment 220 may be adapted to overlap and couple to each other in front of the child's forehead to retain the child's head 902.

The retainer strap 200 may comprise a front side 202 and a rear side 204. The front side 202 may be defined to be the side of the retainer strap 200 that is away from the child. The rear side 204 may be defined to be the side of the retainer strap 200 that contacts the child.

Where reference is made to a hook portion and a loop portion, the hook portion and the loop portion refer to the two (2) halves of a hook-and-loop fastener. The hook portion comprises miniature hooks that are often made of nylon. A characteristic of the hook portion is that the hook portion tends to adhere to craggy fabric that the hook portion comes into contact with. The loop portion comprises miniature loops that are often also made of nylon. A characteristic of the loop portion is that unlike the hook portion, the loop portion tends to feel soft to the touch and does not adhere to craggy fabric that it comes into contact with.

The first strap segment 210 may be a rectangular strap made of a flexible material. The first strap segment 210 may comprise a first car seat fastener 212 coupled to the front left of the first strap segment 210. The first car seat fastener 212 may be the hook portion of a hook-and-loop fastener. The first car seat fastener 212 may be operable to couple to the left side of the car seat 910. Because the first car seat fastener 212 is located on the front side of the first strap segment 210, the left end of the first strap segment 210 must be curled under to expose the first car seat fastener 212 to the car seat 910.

The first strap segment 210 may comprise a first coupling fastener 214 coupled to the rear right of the first strap segment 210. The first coupling fastener 214 may be the loop portion of a hook-and-loop fastener. The first coupling fastener 214 may be operable to couple to a second coupling fastener 224 located on the front left of the second strap segment 220.

The first strap segment 210 may comprise a storage fastener 216 coupled to the front right of the first strap segment 210. The storage fastener 216 may be the hook portion of a hook and loop fastener. The storage fastener 216 may be operable to hold the right end of the first strap segment 210 out of the way when the retainer strap 200 is not in use by coupling the right end of the first strap segment 210 to the car seat 910. The second coupling fastener 224 on the second strap segment 220 may likewise couple to the car seat 910 when the retainer strap 200 is not in use in order to hold the left end of the second strap segment 220 out of the way when the retainer strap 200 is not in use.

The second strap segment 220 may be a rectangular strap made of a flexible material. The second strap segment 220 may comprise a second car seat fastener 222 coupled to the front right of the second strap segment 220. The second car seat fastener 222 may be the hook portion of a hook-and-loop fastener. The second car seat fastener 222 may be operable to couple to the right side of the car seat 910. Because the second car seat fastener 222 is located on the front side of the second strap segment 220, the right end of the second strap segment 220 must be curled under to expose the second car seat fastener 222 to the car seat 910.

The second strap segment 220 may comprise the second coupling fastener 224 coupled to the front left of the second strap segment 220. The second coupling fastener 224 may be the hook portion of a hook-and-loop fastener. The second coupling fastener 224 may be operable to couple to the first coupling fastener 214 located on the rear right of the first strap segment 210.

The first strap segment 210 may be coupled to the second strap segment 220 by placing the right end of the first strap segment 210 in front of the left end of the second strap segment 220 and pressing the first coupling fastener 214 and the second coupling fastener 224 together.

The right end of the first strap segment 210 may comprise a decoupling handle 218. The decoupling handle 218 may be a loop of material that may be adapted to be grasped and pulled by a user to assist in separating the first coupling fastener 214 and the second coupling fastener 224. As non-limiting examples, the decoupling handle 218 may be made of fabric, plastic, or metal.

The first strap segment 210 and the second strap segment 220 may be made of a flexible, flame-resistant material. As non-limiting examples, the first strap segment 210 and the second strap segment 220 may be made from nylon, neoprene, polyester, or any combination thereof.

Although this disclosure describes the features of the invention in terms of directional terms left and right, those of ordinary skill in the art will recognize that an alternative mirror-image embodiment of the invention that reverses left and right falls within the spirit and scope of the present invention as defined in the claims.

In use, the user may place the child into the car seat 910 and may secure the retainer strap 200 across the child's forehead to minimize head movement while sleeping. To secure the retainer strap 200 across the child's forehead, the user may couple the first car seat fastener 212 of the first strap segment 210 to the left side of the car seat 910 and may couple the second car seat fastener 222 of the second strap segment 220 to the right side of the car seat 910. The user may then place the left end of the second strap segment 220 in front of the child's forehead, may place the right end of the first strap segment 210 in front of the second strap segment 220, and may press the first coupling fastener 214 and the second coupling fastener 224 together to join the first strap segment 210 and the second strap segment 220.

When no longer needed, the retainer strap 200 may be released by pulling on the decoupling handle 218 to separate the first coupling fastener 214 and the second coupling fastener 224. The loose ends of the first strap segment 210 and the second strap segment 220 may then be secure out of the way by pressing the storage fastener 216 on the first strap segment 210 and the second coupling fastener 224 on the second strap segment 220 against the car seat 910.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A two-part retainer strap, comprising:
   a first strap segment having a first car seat fastener, a first coupling fastener, and a storage fastener, wherein the first car seat fastener is coupled to the front left of the first strap segment and is operable to couple the first strap segment to a left side of a car seat;
   a second strap segment having a second car seat fastener, a second coupling fastener, and a right end, wherein the second car seat fastener is coupled to the front right of the second strap segment and is operable to couple the second strap segment to a right side of the car seat;

a front side facing away from the child; and a rear side facing towards the child and, wherein the first car seat fastener is disposed on a front side of the first strap segment and the left end of the first strap segment must be curled under to expose the first car seat fastener to the car seat;

wherein the storage fastener is operable to hold the right end of the first strap segment out of the way when the retainer strap is not in use by coupling the right end of the first strap segment to the car seat;

wherein the second coupling fastener is disposed on the second strap segment couples to the car seat when the retainer strap is not in use in order to hold the left end of the second strap segment out of the way when the retainer strap is not in use; and, wherein the second car seat fastener is disposed on a front side of the second strap segment and the right end of the second strap segment must be curled under to expose the second car seat fastener to the car seat.

2. The two-part retainer strap, according to claim 1, wherein the first car seat fastener is a hook portion of a first hook and loop fastener.

3. The two-part retainer strap, according to claim 2, wherein the first coupling fastener is a loop portion of the first hook and loop fastener.

4. The two-part retainer strap, according to claim 1, wherein the first coupling fastener is coupled to the rear right of the first strap segment.

5. The two-part retainer strap, according to claim 1, wherein the first coupling fastener is operable to couple to the second coupling fastener located on the front left of the second strap segment.

6. The two-part retainer strap, according to claim 1, wherein the storage fastener is coupled to the front right of the first strap segment.

7. The two-part retainer strap, according to claim 1, wherein the storage fastener is the hook portion of a second hook and loop fastener.

8. The two-part retainer strap, according to claim 7, wherein the second coupling fastener is a hook portion of the second hook and loop fastener.

9. The two-part retainer strap, according to claim 1, wherein the right end of the first strap segment includes a decoupling handle.

10. The two-part retainer strap, according to claim 1, wherein decoupling handle is a loop of material that is adapted to be grasped and pulled by a user to assist in separating the first coupling fastener and the second coupling fastener.

11. The two-part retainer strap, according to claim 9, wherein the decoupling handle is made of material selected from the group consisting of fabric, plastic, or metal.

12. The two-part retainer strap, according to claim 1, wherein the right end of the first strap segment and the left end of the second strap segment are adapted to overlap and couple to each other in front of the child's forehead to retain the child's head.

13. The two-part retainer strap, according to claim 1, wherein the second car seat fastener is operable to couple to the right side of the car seat.

14. The two-part retainer strap, according to claim 1, wherein the second coupling fastener is operable to couple to the first coupling fastener disposed on the rear right of the first strap segment.

15. The two-part retainer strap, according to claim 1, wherein the first strap segment is coupled to the second strap segment by placing the right end of the first strap segment in front of the left end of the second strap segment and pressing the first coupling fastener and the second coupling fastener together.

16. The two-part retainer strap, according to claim 1, wherein the first strap segment and the second strap segment are made of material selected from the group consisting of made nylon, neoprene, polyester, or any combination thereof.

* * * * *